United States Patent
Wang et al.

(10) Patent No.: US 9,027,153 B2
(45) Date of Patent: May 5, 2015

(54) OPERATING A COMPUTER WITH A TOUCHSCREEN

(71) Applicant: Motorola Mobility LLC, Libertyville, IL (US)

(72) Inventors: Zhao Yu Wang, New Taipei (TW); Yu-Jen Huang, Taipei (TW)

(73) Assignee: Google Technology Holdings LLC, Mountain View, CA (US)

( * ) Notice: Subject to any disclaimer, the term of this patent is extended or adjusted under 35 U.S.C. 154(b) by 117 days.

(21) Appl. No.: 13/834,832

(22) Filed: Mar. 15, 2013

(65) Prior Publication Data

US 2014/0283112 A1    Sep. 18, 2014

(51) Int. Cl.
| | |
|---|---|
| *G06F 21/00* | (2013.01) |
| *G06F 21/84* | (2013.01) |
| *G06F 21/36* | (2013.01) |
| *H04M 1/673* | (2006.01) |
| *G06F 3/0488* | (2013.01) |

(52) U.S. Cl.
CPC ........... *G06F 21/84* (2013.01); *G06F 21/36* (2013.01); *H04M 1/673* (2013.01); *H04M 2250/22* (2013.01); *G06F 3/04883* (2013.01)

(58) Field of Classification Search
USPC ...................................... 726/27–30
See application file for complete search history.

(56) References Cited

U.S. PATENT DOCUMENTS

| | | | |
|---|---|---|---|
| 5,991,441 | A | 11/1999 | Jourjine |
| 8,136,053 | B1 | 3/2012 | Miller et al. |
| 8,286,103 | B2 | 10/2012 | Chaudhari et al. |
| 2003/0034185 | A1 | 2/2003 | Kaikuranta |
| 2003/0090506 | A1 | 5/2003 | Moore et al. |
| 2005/0048457 | A1 | 3/2005 | Ferrigno et al. |
| 2007/0259716 | A1 | 11/2007 | Mattice et al. |
| 2009/0135142 | A1 | 5/2009 | Fu et al. |
| 2009/0241072 | A1 | 9/2009 | Chaudhri et al. |
| 2009/0264159 | A1 | 10/2009 | Hsieh et al. |
| 2010/0077292 | A1 | 3/2010 | Harris |
| 2010/0081502 | A1 | 4/2010 | Rasmussen et al. |

(Continued)

FOREIGN PATENT DOCUMENTS

| | | |
|---|---|---|
| EP | 1959338 A2 | 8/2008 |
| EP | 2290514 A2 | 3/2011 |
| EP | 2490116 A1 | 8/2012 |

OTHER PUBLICATIONS

International Search Report and Written Opinion of international application No. PCT/US2014/015479, mailed May 30, 2014, 9 pp.

(Continued)

*Primary Examiner* — Ghazal Shehni
(74) *Attorney, Agent, or Firm* — Shumaker & Sieffert, P.A.

(57) ABSTRACT

Disclosed are computers and methods of operating those computers. In the methods, a computer in a touch lock state displays a lock screen image showing a cover layer superimposed over, and obscuring, a background layer. A user enters a touch input to a touch screen of the computer, thereby specifying a portion of that touchscreen. The lock screen image is then modified so that the cover layer does not obscure the background layer in the specified portion of the touchscreen. The cover layer in the region of the touchscreen that is not specified in the touch input continues to obscure the background layer in those regions. If the portion of the touchscreen specified by the touch input exceeds a threshold amount the computer may be changed from being in a touch lock state to being in a touch unlock state.

20 Claims, 6 Drawing Sheets

(56) References Cited

U.S. PATENT DOCUMENTS

| | | | |
|---|---|---|---|
| 2010/0125785 A1 | 5/2010 | Moore et al. | |
| 2011/0256848 A1 | 10/2011 | Bok et al. | |
| 2012/0084734 A1 | 4/2012 | Wilairat | |
| 2012/0098639 A1 | 4/2012 | Ijas | |
| 2012/0131508 A1 | 5/2012 | Lee | |
| 2012/0220264 A1* | 8/2012 | Kawabata | 455/411 |
| 2013/0027316 A1 | 1/2013 | Akella | |
| 2013/0063380 A1 | 3/2013 | Wang et al. | |

OTHER PUBLICATIONS

Paul Morris, "Pinch-to-Unlock Tweak Replaces Stock Slide Gesture Method on the Lock Screen to Unlock iOS Devices", http://www.redmondpie.com/pinch-to-unlock-tweak-replaces-stock-slide-gesture-method-on-thelock-screen-to-unlock-ios-devices/, Oct. 22, 2013, 3 pages.

Phil Synowiec, "Unlock Your iPhone Using Different Gestures With 'StyleUnlock' iPod Touch, iPad—iOS Vlog 511", http://www.youtube.com/watch?v=97dWkFXoqUM, Aug. 23, 2011, 1 page.

Verizon Wireless, "Phone Lock—Motorola Devour A555", http://support.verizonwireless.com/clc/devices/knowledge_base.html?id=30085, accessed Mar. 15, 2013, 26 pages.

"iClarified a Look at the New Lock Screen Camera Launch in iOS 5.1 [Video]," Retrieved from http://www.iclarified.com/entry/index.php?enid=20520, accessed on Aug. 31, 2012, 2 pp.

Rehman, "Add Home Screen Widgets to Android Lock Screen With Generic Lockscreen," Retrieved from http://www.addictivetips.com/mobile/add-home-screen-widgets-to-android-lock-screen-with-generic-widget-lockscreen/, accessed on Aug. 31, 2012, 3 pp.

"WidgetLocker Lockscreen, TeslaCoil Software," Retrieved from https://play.google.com/store/apps/details?id=com.teslacoilsw.widgetlocker&hl=en, accessed on Aug. 31, 2012, 2 pp.

"All in One Cydget—Live Your iPhone Lockscreen," Retrieved from http://www.ihackintosh.com/2010/01/all-in-one-cydget-live-your-iphone-lockscreen/, accessed on Aug. 31, 2012, 5 pp.

"Sweet lockscreen widget iPhone iPod," Retrieved from http://www.youtube.com/watch?v=XYnO51FsNeQ, accessed on Aug. 31, 2012, 3 pp.

"Photo library browser widget on lockscreen," Retrieved from https://www.google.com/search?q=photo+library+browser+widget+on+lockscreen&h1=en&client=firefox-a&hs=4cR&rls=org.mozilla:en-, accessed on Aug. 31, 2012, 5 pp.

"Get Sense 3.0 Lockscreen + Top 10 Best New Android Apps," Retrieve from http://www.youtube.com/watch?v=ees0Y1jGySo, accessed on Sep. 19, 2012, 3 pp.

"What if iPhone had . . . Dashboard Widgets," Retrieved from http://www.youtube.com/watch?v=7_1quYGZPvg, accessed on Sep. 19, 2012, 3 pp.

* cited by examiner

OPERATING A COMPUTER WITH A TOUCHSCREEN

FIELD OF THE INVENTION

The present invention relates to computers with touchscreens and the operation thereof.

BACKGROUND OF THE INVENTION

Many conventional computers, in particular portable computers, for example smartphones, tablet computers, etc., include touchscreens.

In order to prevent a computer performing an action or operation in response to an accidental touch input to that computer's touchscreen, many computers have a touch lock function. In other words, many computers may be placed in a "locked" state whereby the computer ignores most touch inputs to the touchscreen.

The exception is an unlock touch gesture. When the computer recognizes an unlock touch gesture, the computer "unlocks" the touchscreen. In other words, a user of the computer has to change that computer from being in its locked state to being in an unlocked state. The unlocked computer supports full operation of both the display layer and the touch layer of the touchscreen.

BRIEF DESCRIPTION OF THE DRAWINGS

The accompanying figures, in which like reference numerals refer to identical or functionally-similar elements throughout the separate views and which are incorporated in and form a part of the specification, further illustrate various embodiments and, together with the detailed description, serve to explain the principles of the embodiments.

DETAILED DESCRIPTION

Various embodiments provide computers with touchscreens and methods of operating those computers. A computer operating in a touch lock, or "locked", state displays, on a display of a touchscreen, a lock screen image. The lock screen image depicts a cover layer superimposed over a background layer. The cover layer may be an opaque or translucent layer including an image or animation effect. The background layer may include information such as time/date information etc. A user enters a touch input to the computer by wiping one or more digits over a portion of the touchscreen, thereby specifying a portion of the display of the touchscreen. The lock screen image is then modified so that the cover layer does not obscure the background layer in the portion of the display of the touchscreen specified by the touch input. The cover layer in the region of the display of the touchscreen that is not specified by the touch input continues to obscure the background layer in those areas of the display. In some embodiments, if the portion of the display of the touchscreen specified by the touch input exceeds a threshold amount, the computer is "unlocked" or changed from being in a touch lock state to being in a touch unlock state. The threshold amount may be, for example, 50%, 60%, 70%, 80%, or 90% of the touchscreen area. Unlocking the computer may include removing the lock screen image, or just the cover layer, from the display of the touchscreen.

Thus, a user is able to reveal information included in the background layer by "wiping away" a portion of the cover layer using a finger, without having to unlock the computer. The user is able to unlock the computer using or extending the same touch gesture used to reveal information included in the background layer.

In some embodiments, the cover layer is restored after the background layer information has been revealed for a predefined amount of time. Thus, the touchscreen does not reveal background layer information for longer than the predefined amount of time.

Figure 1:
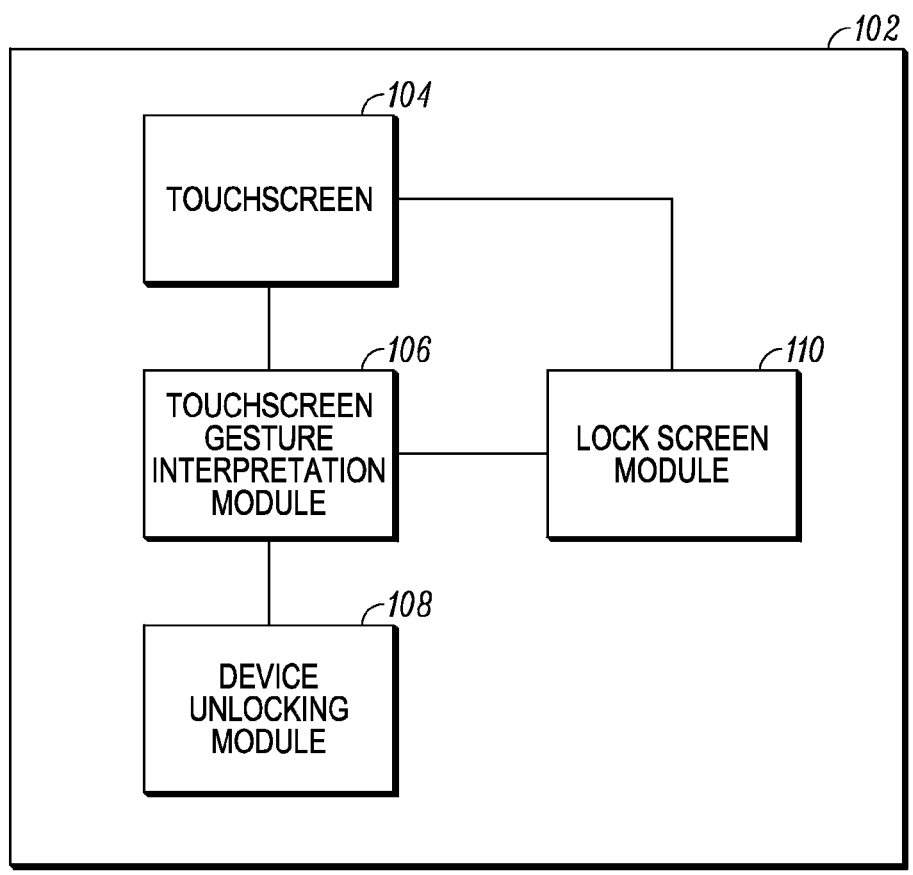
FIG. 1 is a schematic illustration (not to scale) of a computer with a touchscreen.

FIG. 1 is a schematic illustration (not to scale) showing an example of a computer 102. In this embodiment, the computer 102 is a mobile computing device such as a smartphone, a tablet computer, a laptop computer, a mobile station, an entertainment appliance, a wireless telephone, or a netbook. However, in other embodiments, the computer 102 may be implemented as a remote controller, an electronic toy, a vending machine, a kitchen appliance, or other type of electronic device. In some embodiments, the computer 102 is a device including a touchscreen in the form of a transparent window. In such embodiments, the touchscreen may, for example, form a window of a vehicle or a building.

The computer 102 includes a touchscreen 104, a touch gesture interpretation module 106, a device unlocking module 108, and a lock screen module 110.

In this embodiment, the touchscreen 104 includes both an electronic display and a touch-sensor. The display may be implemented using an LCD or OLED. The touch sensor may be implemented using capacitive, resistive, surface acoustic wave, optical, and other technologies. The touchscreen 104 is configured to receive a touch input from the user of the computer 102. The touchscreen 104 is coupled to the touch gesture interpretation module 106 such the touchscreen may send a signal corresponding to a received touch input to the touch gesture interpretation module 106. In some embodiments, the computer 102 includes a different type of touch sensor module, such as a touchpad, instead of or in addition to the touchscreen 104.

The touch gesture interpretation module 106 may include or be part of one or more processors. The touch gesture interpretation module 106 may be implemented using any suitable type of hardware, software, firmware or combination thereof.

The touch gesture interpretation module 106 is configured to recognize a touch input to the touchscreen 104. Such a touch input may, for example, be made by a user of the computer 102 touching the touchscreen 104 with a finger or other item, such as a stylus. A touch input may be in the form of a touch gesture made by a user moving, wiping, or drawing the finger over the touchscreen 104 in a certain shape, pattern, or motion. Any suitable technology may be utilized to sense such a touch input.

The touch gesture interpretation module 106 is configured to recognise or process a touch gesture and determine an operation or action that corresponds to that touch gesture. As described in more detail below with reference to FIG. 3, the touch gesture interpretation module 106 is further configured to output a signal specifying the operation or action that is to be performed.

In addition to being coupled to the touchscreen 104, the touch gesture interpretation module 106 is coupled to the device unlocking module 108 and the lock screen module 110. With these connections, the touch gesture interpretation module 106 may send an output to either or both of the device unlocking module 108 and the lock screen module 110. The output of the touch gesture interpretation module 106 is a signal specifying the operation or action corresponding to the touch gesture or touch input received and processed by the touch gesture interpretation module 106.

In this embodiment, as described in more detail below with reference to FIG. 3, the device unlocking module 108 is configured to, in response to receiving a signal from the touch gesture interpretation module 106, change the state of the computer 102 from a "locked state" to an "unlocked state". In other words, device unlocking module 108 is configured to change the computer 102 from being locked to being unlocked. In this embodiment, the computer 102 in its locked state ignores certain touch inputs to the touchscreen 104. The ignored touch inputs may be all touch inputs except those touch inputs that correspond to "unlocking" the computer 102. Thus, no actions or operations are performed by the computer 102 in response to receiving those certain touch inputs. This prevents or reduces the likelihood of improper operations being performed by the computer 102 due to accidental touch inputs. When the computer 102 is in its unlocked state, however, the computer 102 processes touch inputs to the touchscreen 104 and performs the actions or operations corresponding to those touch inputs.

In this embodiment, the lock screen module 110 is configured to display, on the display of the touchscreen 104, a "lock screen" image. The lock screen image is described in more detail below with reference to FIG. 2. In this embodiment, lock screen module 110 controls the display of the lock screen image on the display of the touchscreen 104 while the computer 102 is in its locked state. As described in more detail below with reference to FIG. 3, the lock screen module 110 is further configured to modify or update the lock screen image in accordance with a signal received by the lock screen module 110 from the touch gesture interpretation module 106.

Figure 2:
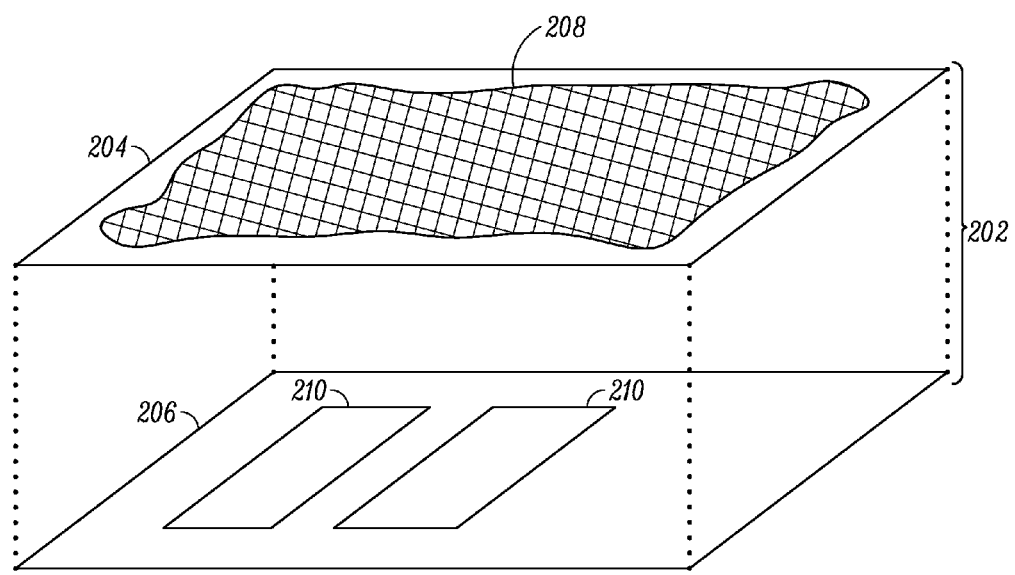
FIG. 2 is a schematic illustration (not to scale) showing a lock screen image for displaying on a touchscreen of the computer.

FIG. 2 is an example schematic illustration (not to scale) showing the lock screen image 202 that is displayed by the touchscreen 104 while the computer 102 is operating in its locked state.

In this embodiment, the lock screen image 202 includes a cover layer 204 and a background layer 206.

In this embodiment, when the computer 102 is in its locked state, the cover layer 204 of the lock screen image 202 is superimposed over, or overlaid onto, the background layer 206. In other words, the cover layer 204 covers, or obscures, the background layer 206.

The cover layer 204 includes an image 208. The image 208 may be any obscuring image such as an image of cloud, an image of fog, an image of water droplets, a grid, or other pattern. In some embodiments, the cover layer 204 does not include an image. For example, the cover layer 204 may be a blank, or black, screen. In some embodiments, the cover layer 204 includes a plurality of images. In some embodiments the cover layer 204 includes information such as time and date information, location information for the computer 102, local temperature information, etc.

The background layer 206 has at least one information window 210. Each information windows 210 may include any appropriate information such as message notifications, calendar reminders, current time/date information, an image, a news article, etc. In other embodiments, the background layer 206 has a different number of information windows 210. In some embodiments, the background layer 206 includes the "home screen" of a computer program or graphical user interface operating on the computer 102. In some embodiments, the background layer 206 includes a desktop environment from which a user of the computer may select icons, windows, toolbars, folders, wallpapers, desktop widgets, etc.

Although FIG. 2 schematically depicts the lock screen image 202 as having two distinct layers, a person of ordinary skill in the art of graphics programming will understand that the lock screen image can be constructed with a single graphical layer and yet produce a similar visual effect for a user. Additionally, more than two layers may be implemented so that the background layer includes multiple layers of information windows.

Figures 3, 3A, 3B:
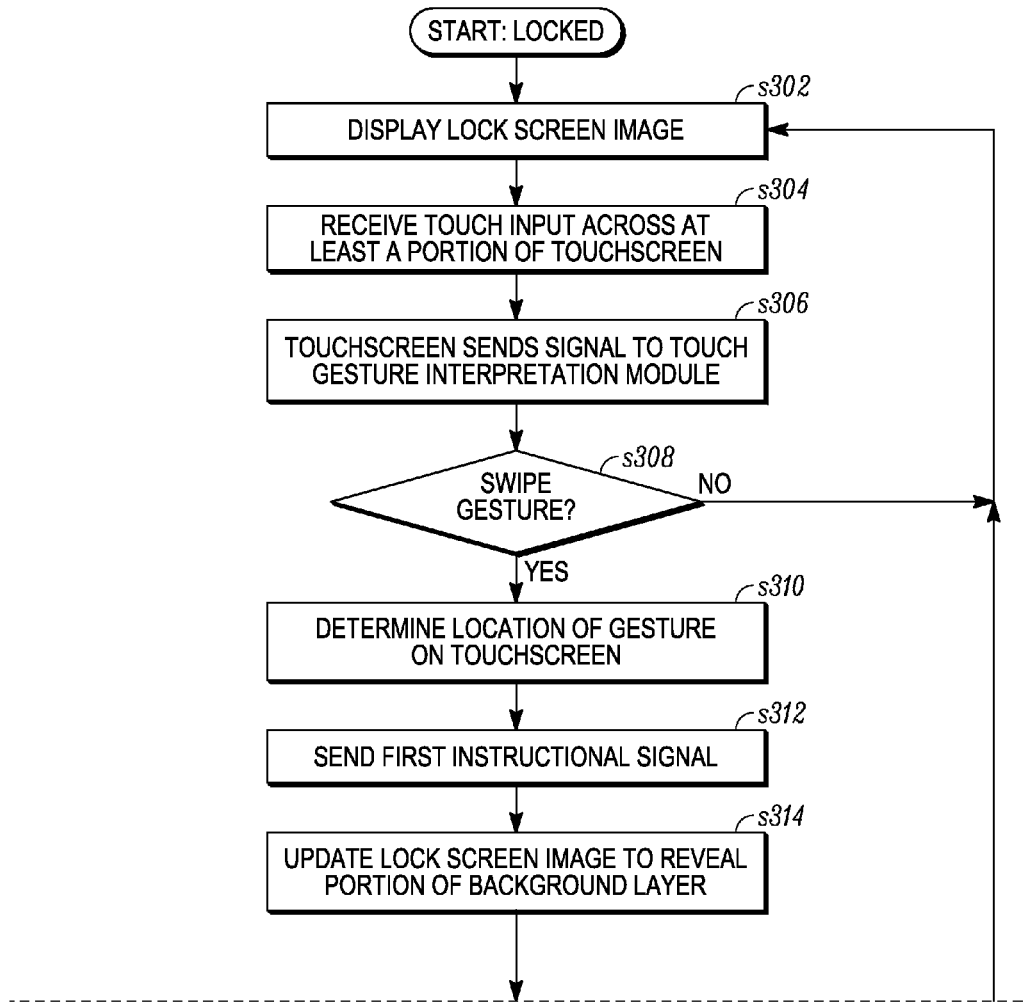
FIGS. 3A and 3B are a process flowchart showing certain steps of an embodiment of a process of operating the computer with touchscreen.
Figure 3B:
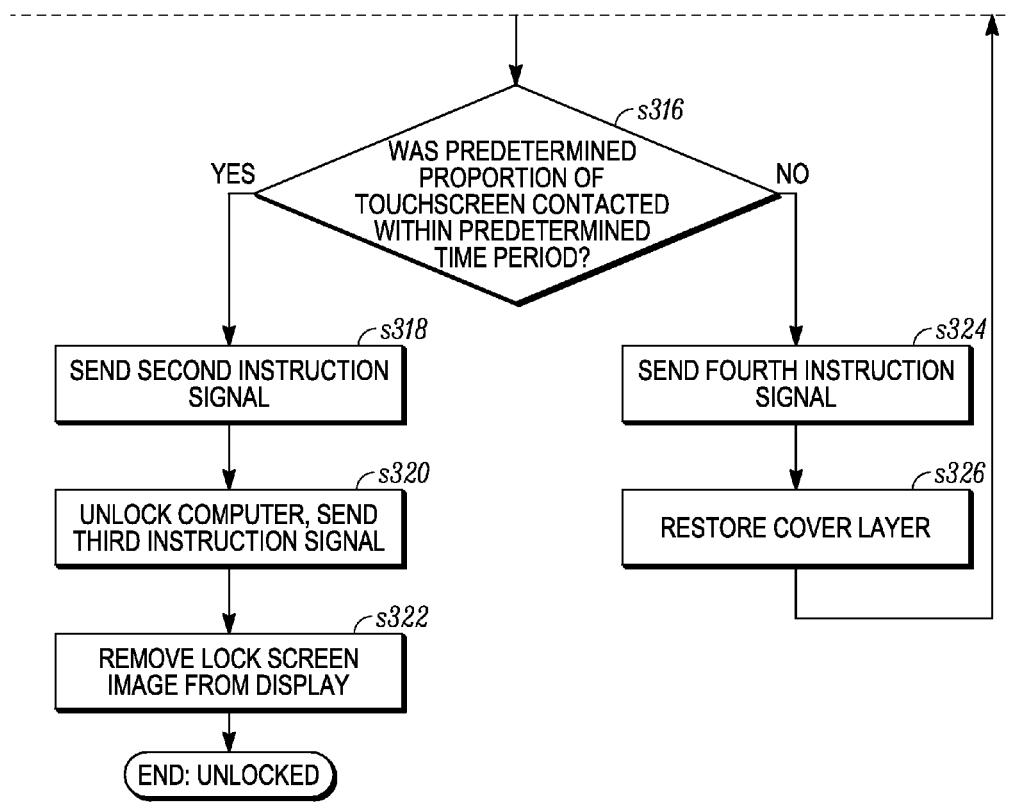

FIG. 3 is a process flowchart showing certain steps of an embodiment of a process of operating the computer 102.

At step s302, the computer 102 is in its locked state. Thus, certain touch inputs to the touchscreen 104 of the computer 102 are, in effect, ignored by the computer 102. No action corresponding to those inputs is performed by the computer 102. Also, the display of the touchscreen 104 displays the lock screen image 202, which includes the cover layer 204 superimposed over the background layer 206.

Figure 4:
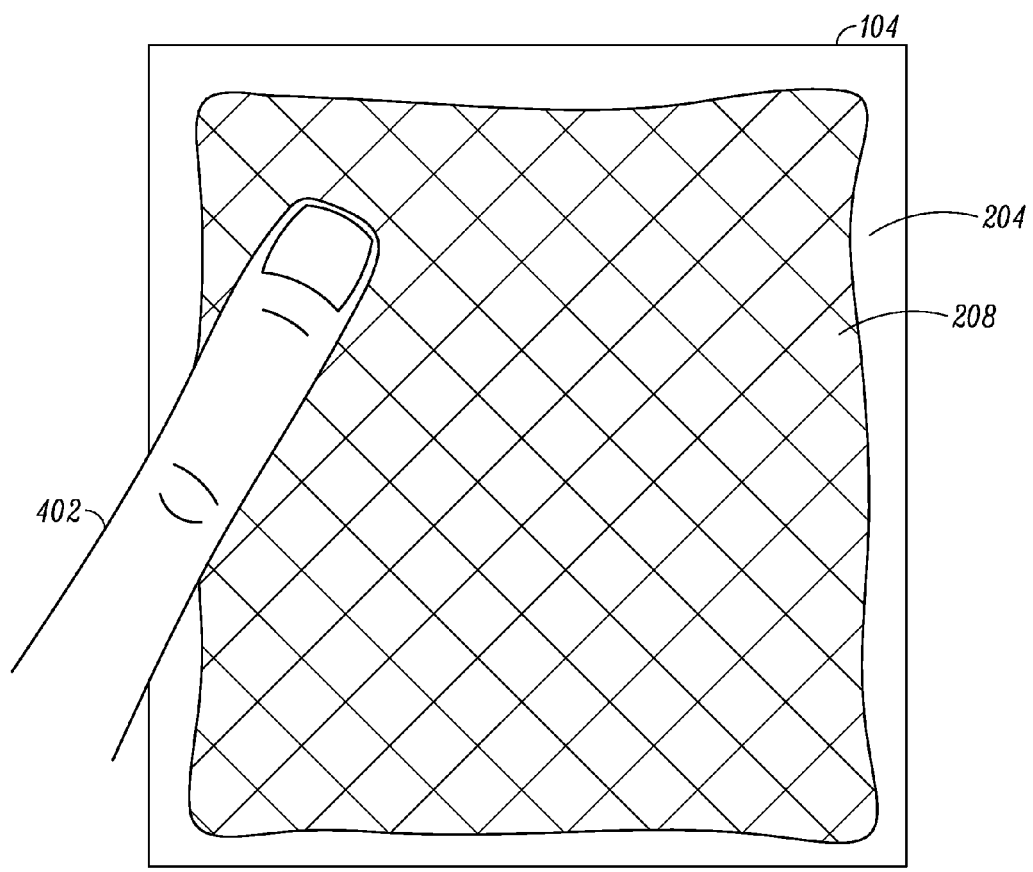
FIG. 4 is a schematic illustration (not to scale) showing a user contacting the touchscreen.
Figure 5:
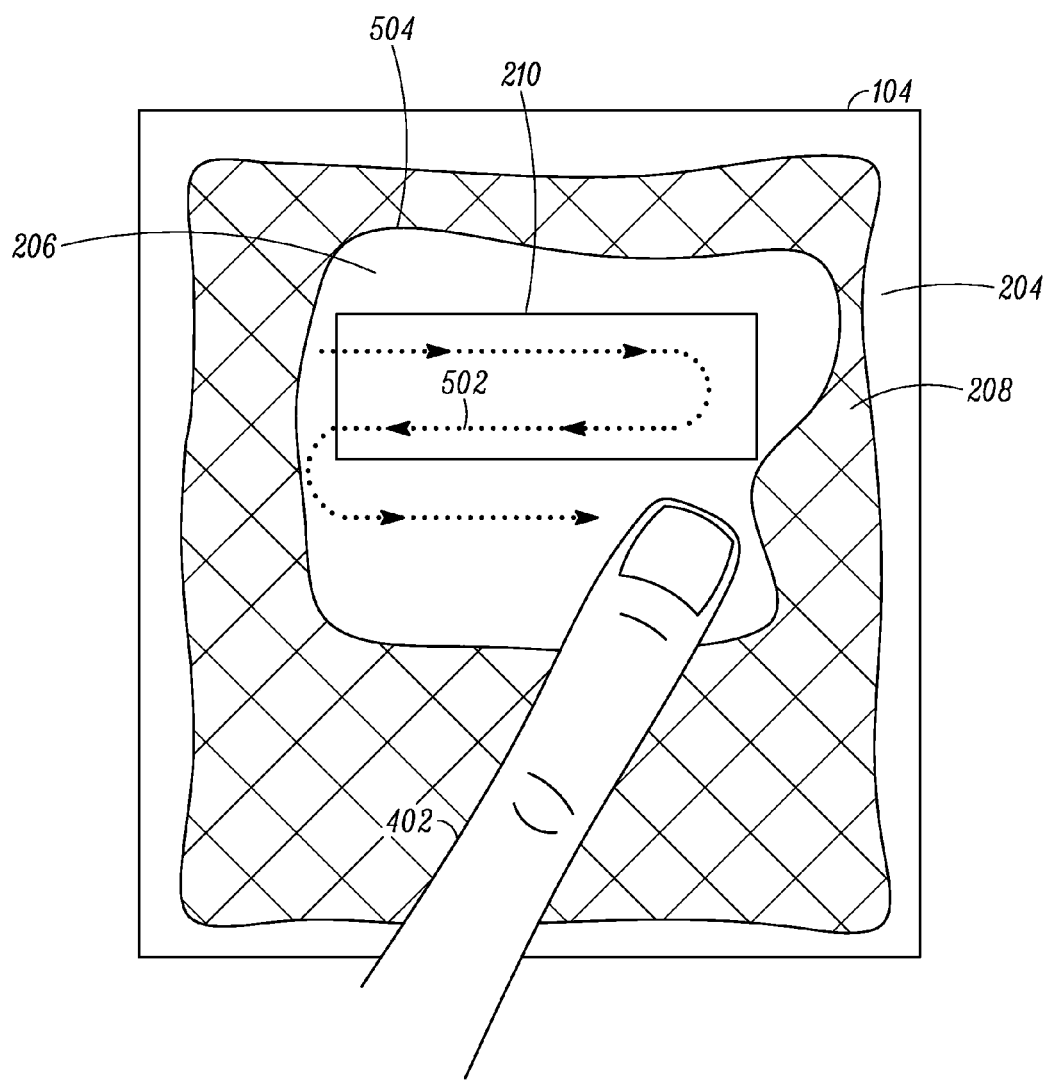
FIG. 5 is a schematic illustration (not to scale) showing the touchscreen as the user performs a touch gesture on the touchscreen.

At step s304, the user of the computer 102 inputs a touch input, in the form of a touch gesture, into the computer 102. In this embodiment, this is performed as shown in FIGS. 4-5. Firstly, the user of the computer 102 touches the touchscreen 104 with a finger 402. Secondly, the user wipes, or moves, the finger 402 over a portion of the touchscreen 104.

FIG. 4 is a schematic illustration (not to scale) showing the finger 402 of the user contacting the touchscreen 104. In this embodiment, the user's finger 402 touches a point on the image 208 on the cover layer 204 displayed by the touchscreen 104.

At step s306, the touchscreen 104 sends a signal corresponding to the touch gesture, which is input into the computer 102 by the user at step s304, to the touch gesture interpretation module 106.

At step s308, using the received signal, the touch gesture interpretation module 106 determines whether or not the touch gesture performed by the user at step s304 is a swipe, or wiping, gesture. In other words, the touch gesture interpretation module 106 determines whether the touch gesture includes the user wiping the finger 402 across a portion of the touchscreen 104.

If at step s308 it is determined that the touch gesture is not a swipe or wiping gesture, the process of FIG. 3 returns to step s302. However, if at step s308 it is determined that the touch gesture is a swipe or wiping gesture, the process of FIG. 3 proceeds to step s310.

At step s310, the touch gesture interpretation module 106 determines the location, on the touchscreen 104, of the touch gesture. In other words, the touch gesture interpretation module 106 determines the location, on the touchscreen 104, of the portion of the touchscreen 104 over which the user's finger 402 was wiped, or swiped, at step s304.

At step s312, the touch gesture interpretation module 106 sends an instruction signal, hereinafter referred to as the "first instruction signal", to the lock screen module 110. In this embodiment, this first instruction signal specifies the portion of the touchscreen 104 over which the user's finger 402 was wiped at step s304. The first instruction signal further specifies that the portion of the cover layer 204 that is displayed on the identified portion of the touchscreen 104 is to be removed.

At step s314, using the received first instruction signal, the lock screen module 110 updates the lock screen image 202 displayed on the display of the touchscreen 104. In this embodiment, this is performed such that the display of the touchscreen 104 no longer shows the portion of the cover layer 204 that is displayed under the portion of the touchscreen 104 that the user's finger 402 wiped at step s304. In other words, the lock screen module 110 removes, from the displayed lock screen image 202, the portion of the cover layer 204 that the user's finger 402 touched at step s304. In some embodiments, instead of removing the portion of the cover layer 204 that the user's finger 402 touched step s304, that portion of the cover layer 204 may be made transparent by the lock screen module 110.

FIG. 5 is a schematic illustration (not to scale) showing the touchscreen 104 after performance of step s314.

In this embodiment, the user's finger 402 has been wiped/moved over a portion of the touchscreen 104. The path of the user's finger 402 over the touchscreen 104 is indicated in FIG. 5 by dotted arrows and the reference numeral 502.

A portion of the cover layer 204 that the user's finger 402 has been moved over has been removed. Thus, in effect, a "hole" through the cover layer 204 is created. This "hole" is indicated in FIG. 5 by the reference numeral 504. In this embodiment, a portion of the background layer 206, that includes part of an information window 210, is visible through the hole 504 in the cover layer 204.

Thus, in this embodiment, the experience of the user is that of "wiping away" at least a portion of the obscuring image 208 from the display of the touchscreen 104 to reveal the background layer 206 beneath the image 208/cover layer 204. For example, if the image 208 of the cover layer 204 is an image of a cloud, fog, or some water droplets that obscures the background layer 206, by performing the touch gesture at step s304, the user wipes away the cloud/fog/water using the finger 402 so as to reveal information contained in the background layer 206.

At step s316, the touch gesture interpretation module 106 further processes the touch gesture entered into the computer 102 at step s304. In particular, the touch gesture interpretation module 106 determines whether or not the touch gesture performed at step s304 includes the user contacting at least a predetermined threshold proportion of the touchscreen 104 within a predetermined time-period.

In this embodiment, the predetermined threshold proportion of the touchscreen 104 may be any appropriate proportion. For example, the threshold proportion is a proportion within the range 50%-90%. As another example, the threshold proportion is a proportion within the range 70%-90%, such as 80%.

In this embodiment, the predetermined time period may be any appropriate time period, such as a time period in the range 0-5 seconds, or a time period in the range 0-3 seconds. In some embodiments, no predetermined time period is specified/used. In some embodiments, at step s316, the touch gesture interpretation module 106 determines whether or not, at step s304, the user wipes the finger 402 over at least a predetermined proportion of the touchscreen 104 using a single, unbroken touch gesture. A single, unbroken touch gesture may be a touch gesture that the user performs without taking the finger 402 away from the touchscreen 104 surface.

If at step s316 it is determined that the touch gesture performed at step s304 involves a finger 402 swiping over at least the predetermined proportion of the touchscreen 104 within the predetermined time period, the process of FIG. 3 proceeds to step s318.

At step s318, the touch gesture interpretation module 106 generates an instruction signal, hereinafter referred to as the "second instruction signal". The touch gesture interpretation module 106 sends second instruction signal to the device unlocking module 108. The second instruction signal specifies that the computer 102 is to be "unlocked". Thus, the second instruction signal specifies that the computer 102 is to be changed from being in its locked state to being in its unlocked state.

At step s320, using the received second instruction signal, the device unlocking module 108 unlocks the computer 102. In other words, the device unlocking module 108 changes the computer 102 from operating in its locked state to operating in its unlocked state.

In this embodiment, the process of unlocking the computer 102 performed at step s320 by the device unlocking module 108 includes the device unlocking module 108 sending an instruction signal, hereinafter referred to as the "third instruction signal", to the lock screen module 110. The third instruction signal specifies that the lock screen image 202 is not to be displayed by the touchscreen 104. In other embodiments, the third instruction signal is acquired by the lock screen module 110 from a different entity. For example, the third instruction signal may be acquired by the touch gesture interpretation module 106.

At step s322, in response to receiving the third instruction signal, the lock screen module 110 prevents or opposes the lock screen image 202 being displayed on the touchscreen 104. For example, the lock screen module 110 may remove the lock screen image 202 from being displayed by the touchscreen 104.

After removal of the lock screen image 202 from the display of the touchscreen 104, the display of the touchscreen 104 may display any appropriate "unlock screen" image. For example, the display may display a GUI that is normally displayed on the touchscreen 104 while the computer 102 is in its unlocked state.

In some embodiments, the background layer 206 of the lock screen image 202 is the same as a layer that is displayed on the touchscreen 104 while the computer 102 is in its unlocked state. In other words, the background layer 206 may form the unlock screen image. Thus, in some embodiments, at step s322, only the cover layer 204 is removed and the background layer 206 remains displayed. In such embodiments, the background layer 206 may, for example, be an execution screen of an application.

Returning now to the case where, at step s316, it is determined that the touch gesture performed at step s304 does not include the user wiping the finger 402 over at least the predetermined proportion of the touchscreen 104 within a predetermined time period, at step s324 the touch gesture interpretation module 106 generates an instruction signal, hereinafter referred to as the "fourth instruction signal".

The touch gesture interpretation module 106 sends the fourth instruction signal to the lock screen module 110.

In this embodiment, the fourth instruction signal specifies that the full cover layer 204 is to be displayed on the display of the touchscreen 104. In other words, the fourth instruction signal specifies that the portion of the cover layer 204 that was removed at step s314 (to form the hole 504) is to be re-displayed. In other words, the fourth instruction signal specifies that the cover layer 204 is to be "re-generated" or "restored" such that the touchscreen 104 displays the full cover layer 204.

At step s326, in response to receiving the fourth instruction signal, the lock screen module 110 modifies the cover layer 204 of the lock screen image 202 such that the full cover layer 204 is displayed on the display of the touchscreen 104. Thus, at step s326, the touchscreen 104 of the computer 102 reverts to being as illustrated in FIG. 4.

In some embodiments, the lock screen module 110 modifies the cover layer 204 after a predefined time period has elapsed. In this way, the background layer 206 is displayed for the predefined time period before the full cover layer 204 is displayed on the touchscreen 104. The predefined time period may for example be a time between 0 and 5 seconds. The predefined time period may be selected by the user.

In this embodiment, if at step s316 it is determined that the touch gesture performed at step s304 does not include the user wiping the finger 402 over at least the predetermined proportion of the touchscreen 104 within a predetermined time period, the computer 102 remains in its locked state.

Thus, a method for unlocking a computer exploits a touchscreen capability of the device. As the user wipes a finger over the touch screen, a cover layer of a lock screen image is updated substantially instantly, thereby providing the effect of the user "wiping away" the cover layer to reveal some or all of an underlying background layer.

When the lock screen image is displayed by the touchscreen, the user may wipe a finger over a relatively small proportion of the touchscreen, a "small proportion" being a proportion that is less than the predefined threshold proportion. By doing this, the user reveals some information that is present on the background layer. Advantageously, whilst doing this, the computer remains in its locked state. Advantageously, after the user has revealed the desired information and no longer touches the touchscreen, after a predefined amount of time, the cover layer is restored.

Thus, a user is able view certain information on the computer without having to unlock the computer and without having to have that information displayed constantly.

Alternatively, the user may wipe a finger over a relatively large proportion of the touchscreen, a "large proportion" being a proportion that is greater than or equal to the predefined threshold proportion. By doing so, the user unlocks the computer thereby allowing the user to access the full functionality of the computer.

The above description is based on embodiments of the invention and should not be taken as limiting the invention with regard to alternative embodiments that are not explicitly described herein.

Apparatus for implementing any of the above described arrangements, and performing any of the above described method steps, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the above described process flowchart may be omitted or such process steps may be performed in differing order to that presented above and shown in the process flowchart. Furthermore, although all the process steps have, for convenience and ease of understanding, been depicted as discrete temporally-sequential steps, nevertheless some of the process steps may in fact be performed simultaneously or at least overlapping to some extent temporally.

In above embodiments, the apparatus that detects the user's gesture includes a touchscreen. However, in other embodiments, a directional gesture of the user may be detected in a different way by one or more different modules. For example, in other embodiments the user may perform a gesture without touching a device at all. For example, whilst the user performs a directional gesture, the user's movements may be measured or detected, for example, using one or more cameras or imaging systems. These measurements may then be used to determine the user's gesture. Such systems/apparatus tend to be particularly useful in devices which do not include touchscreens.

In the above embodiments, the cover layer is superimposed on the background layer such that the background layer is, at least to some extent, obscured by the cover layer. The cover layer may for example, be an opaque layer or a translucent layer. In some embodiments the cover layer includes an opaque or translucent image or other visual information. In some embodiments, the cover layer includes an opaque or translucent animation effect.

In the above embodiments, the cover layer of the touch lock screen image is updated when the user performs the "wiping gesture" on the touchscreen. How the cover layer is updated is dependent upon the portion of the touchscreen upon which the user performs the wiping gesture. In other embodiments, how the cover layer is updated may be dependent upon one or more other factors instead of or in addition to which portion of the touchscreen upon which the user performs the wiping gesture. For example, in some embodiments, how the cover layer is updated when the user performs the wiping gesture on the touchscreen is dependent upon the speed with which the user performs the wiping gesture (that is to say how quickly the wiping gesture is performed). Also for example, in some embodiments, how the cover layer is updated when the user performs the wiping gesture on the touchscreen is dependent upon the pressure that the user exerts on the touchscreen while performing the wiping gesture (that is to say, the pressure that the user exerts on the touchscreen while the wiping gesture is performed).

We claim:

1. A method comprising:
   outputting, by a computer and for display, a touch lock screen graphical user interface including a cover layer superimposed over a background layer such that the background layer is at least partially obscured by the cover layer;
   receiving, by a touch gesture interpretation module, an indication of a touch input detected by a touchscreen of the computer, the touch input specifying a portion of the touchscreen at which the touch input is detected;
   outputting, by the computer and for display, an updated touch lock screen graphical user interface such that:
      for the portion of the touchscreen at which the touch input is detected, the cover layer does not obscure the background layer; and
      for a remaining portion of the touchscreen at which the touch input is not detected, the cover layer obscures the background layer; and
   responsive to determining that the portion of the touchscreen at which the touch input is detected exceeds a threshold amount, removing, from the updated touch lock screen graphical user interface, at least the cover layer.

2. The method according to claim 1 further comprising:
   responsive to determining that the portion of the touchscreen at which the touch input is detected exceeds the threshold amount, switching the computer from being in a touch lock state to being in a touch unlock state.

3. The method according to claim 1 further comprising:
responsive to determining that the portion of the touchscreen at which the touch input is detected does not exceed the threshold amount, maintaining the computer in a touch lock state.

4. The method according to claim 1 further comprising:
responsive to determining that the portion of the touchscreen at which the touch input is detected does not exceed the threshold amount, subsequently restoring the cover layer such that, for the portion of the touchscreen at which the touch input is detected, the cover layer obscures the background layer.

5. The method according to claim 4, wherein subsequently restoring the cover layer comprises:
restoring the cover layer after a predefined time period such that the background layer is revealed for the predefined time period.

6. The method according to claim 5, wherein the predefined time period is a time period less than five seconds.

7. The method according to claim 1, wherein removing at least the cover layer, is only performed responsive to determining that, in addition to the portion of the touchscreen at which the touch input is detected exceeding the threshold amount, the touch input is generated by the user performing a gesture on the touchscreen within a predefined time period.

8. The method according to claim 1, wherein removing at least the cover layer, is only performed responsive to determining that, in addition to the portion of the touchscreen at which the touch input is detected exceeding the threshold amount, the touch input is generated by a single, unbroken gesture performed on the touchscreen.

9. The method according to claim 1 further comprising:
responsive to determining that the portion of the touchscreen at which the touch input is detected exceeds the threshold amount, removing the background layer from the updated touch lock screen graphical user interface.

10. The method according to claim 1, wherein the cover layer is a layer selected from a group of layers consisting of: an opaque layer, a translucent layer, an opaque layer including an image or other visual information, a translucent layer including an image or other visual information, an opaque layer including an animation effect, and a translucent layer including an animation effect.

11. The method according to claim 1, wherein the threshold amount is an amount selected from a group of amounts consisting of: a proportion of the touchscreen within the range 50%-90% of the touchscreen, a proportion of the touchscreen within the range 70%-90% of the touchscreen, and 80% of the touchscreen.

12. The method according to claim 1, wherein, the touch input is generated by an object being wiped over the touchscreen, the portion of the touchscreen specified by the touch input being that portion of the touchscreen over which the object is wiped.

13. A computer comprising:
a touchscreen configured to display a lock screen image with a cover layer superimposed over a background layer such that the background layer is at least partially obscured by the cover layer, and to detect a touch input;
a gesture module operatively coupled to the touchscreen and configured to receive a touch input signal, the touch input signal specifying a portion of the touchscreen at which the touch input is detected;
a lock screen module operatively coupled to the touchscreen and the gesture module and configured to modify the lock screen image such that:
for the portion of the touchscreen at which the touch input is detected, the cover layer in that portion of the touchscreen does not obscure the background layer; and
for a remaining portion of the touchscreen at which the touch input is not detected, the cover layer in that remaining portion of the touchscreen obscures the background layer; and
a device unlock module configured to, if the portion of the touchscreen contacted by the user exceeds a threshold amount, remove at least the cover layer from the touchscreen display.

14. The computer according to claim 13, wherein the device unlock module is further configured to:
responsive to determining that the portion of the touchscreen at which the touch input is detected exceeds the threshold amount, switch the computer from being in a touch lock state to being in a touch unlock state.

15. The computer according to claim 13, wherein the device unlock module is further configured to:
responsive to determining that the portion of the touchscreen at which the touch input is detected does not exceed the threshold amount, maintain the computer in a touch lock state.

16. The computer according to claim 13, wherein the lock screen module is further configured to:
responsive to determining that the portion of the touchscreen at which the touch input is detected does not exceed a threshold amount, subsequently restore the cover layer such that, for the portion of the touch screen at which the touch input is detected, the cover layer obscures the background layer.

17. The computer according to claim 13, wherein the device unlock module removes, from the touchscreen, at least the cover layer responsive to determining that, in addition to the portion of the touchscreen for the portion of the touch screen at which the touch input is detected exceeding the threshold amount, the touch input signal is generated by a gesture being performed on the touchscreen within a predefined time period.

18. The computer according to claim 13, wherein the device unlock module removes, from the touchscreen, at least the cover layer responsive to determining that, in addition to the portion of the touchscreen for the portion of the touch screen at which the touch input is detected exceeding the threshold amount, the touch input signal is generated by a single, unbroken gesture on the touchscreen surface.

19. The computer according to claim 13, wherein the cover layer is a layer selected from a group of layers consisting of: an opaque layer, a translucent layer, an opaque layer including an image or other visual information, a translucent layer including an image or other visual information, an opaque layer including an animation effect, and a translucent layer including an animation effect.

20. The computer according to claim 13, wherein the computer is a mobile computing device selected from a group of mobile computing devices consisting of: a smartphone, a tablet computer, a laptop computer, a mobile station, an entertainment appliance, a wireless telephone, and a netbook.

* * * * *